US008134925B2

(12) United States Patent
Yamaguchi

(10) Patent No.: US 8,134,925 B2
(45) Date of Patent: Mar. 13, 2012

(54) DISASTER PREVENTION SYSTEM

(75) Inventor: Yasuo Yamaguchi, Tokyo (JP)

(73) Assignee: Nohmi Bosai Ltd., Tokyo (JP)

( * ) Notice: Subject to any disclaimer, the term of this patent is extended or adjusted under 35 U.S.C. 154(b) by 966 days.

(21) Appl. No.: 11/652,091

(22) Filed: Jan. 11, 2007

(65) Prior Publication Data
US 2007/0159980 A1 Jul. 12, 2007

(30) Foreign Application Priority Data
Jan. 12, 2006 (JP) ................................. 2006-004606

(51) Int. Cl.
*G01R 31/08* (2006.01)
*H04L 12/50* (2006.01)
*H04L 12/42* (2006.01)

(52) U.S. Cl. ..................... 370/235; 370/359; 370/445

(58) Field of Classification Search .................. 370/229, 370/230, 235, 236, 359, 360, 386, 390, 395.53, 370/445; 709/223–224, 232, 235, 240, 244
See application file for complete search history.

(56) References Cited

U.S. PATENT DOCUMENTS

| 4,792,946 | A  | * | 12/1988 | Mayo .............................. 370/245 |
| 5,566,339 | A  | * | 10/1996 | Perholtz et al. ................ 713/340 |
| 5,689,233 | A  | * | 11/1997 | Kurisu et al. ................... 340/506 |
| 6,085,238 | A  | * | 7/2000  | Yuasa et al. ..................... 709/223 |
| 6,195,004 | B1 | * | 2/2001  | Leonowich ............... 340/539.17 |
| 6,272,541 | B1 | * | 8/2001  | Cromer et al. ................. 709/224 |
| 6,473,816 | B1 | * | 10/2002 | Yoshida et al. ................ 710/113 |
| 6,545,602 | B2 | * | 4/2003  | Yamaguchi et al. ........... 340/531 |
| 6,856,252 | B2 | * | 2/2005  | Pfefferseder et al. .......... 340/628 |
| 6,861,952 | B1 |   | 3/2005  | Billmaier |
| 7,228,429 | B2 | * | 6/2007  | Monroe ......................... 713/182 |
| 7,319,853 | B2 | * | 1/2008  | Luebke et al. ................. 455/344 |
| 2002/0138298 | A1 | * | 9/2002  | Ichikawa et al. .................. 705/1 |
| 2002/0171552 | A1 | * | 11/2002 | Tate ............................ 340/573.1 |
| 2003/0061344 | A1 | * | 3/2003  | Monroe ......................... 709/224 |
| 2003/0174070 | A1 | * | 9/2003  | Garrod et al. ............ 340/870.07 |
| 2004/0153701 | A1 | * | 8/2004  | Pickell ............................... 714/4 |
| 2005/0180437 | A1 |   | 8/2005  | Twomey |

FOREIGN PATENT DOCUMENTS

| EP | 0 587 898 | 3/1994 |
| WO | 2005/029781 | 3/2005 |

OTHER PUBLICATIONS

European Search Report issued Apr. 27, 2009 in corresponding European Application No. 07250096.

* cited by examiner

*Primary Examiner* — Aung S Moe
*Assistant Examiner* — Redentor Pasia
(74) *Attorney, Agent, or Firm* — Wenderoth, Lind & Ponack, L.L.P.

(57) ABSTRACT

Each terminal devices (1, 4) connected to one another via a LAN (11) includes: a main control portion (e.g. 31) performing operational control, a transmission LAN unit (34) performing transmission control regarding transmission and reception of disaster prevention information. The unit (34) includes: a transmitting and receiving circuit (36) connected to the portion (31); a transmission control portion (35) performing communication control; an arrival order determining and retransmitting circuit portion (37) connected to the portion (35) and to at least three of transmitting and receiving ports (38) which are capable of connecting to the LAN. Upon receiving an incoming signal of disaster prevention information from one of the portion (35) and the ports (38), the portion (37) outputs the received signal to the rest of them while shutting out for a predetermined period of time an incoming signal from the rest of the ports (38) that has sent the signal.

14 Claims, 4 Drawing Sheets

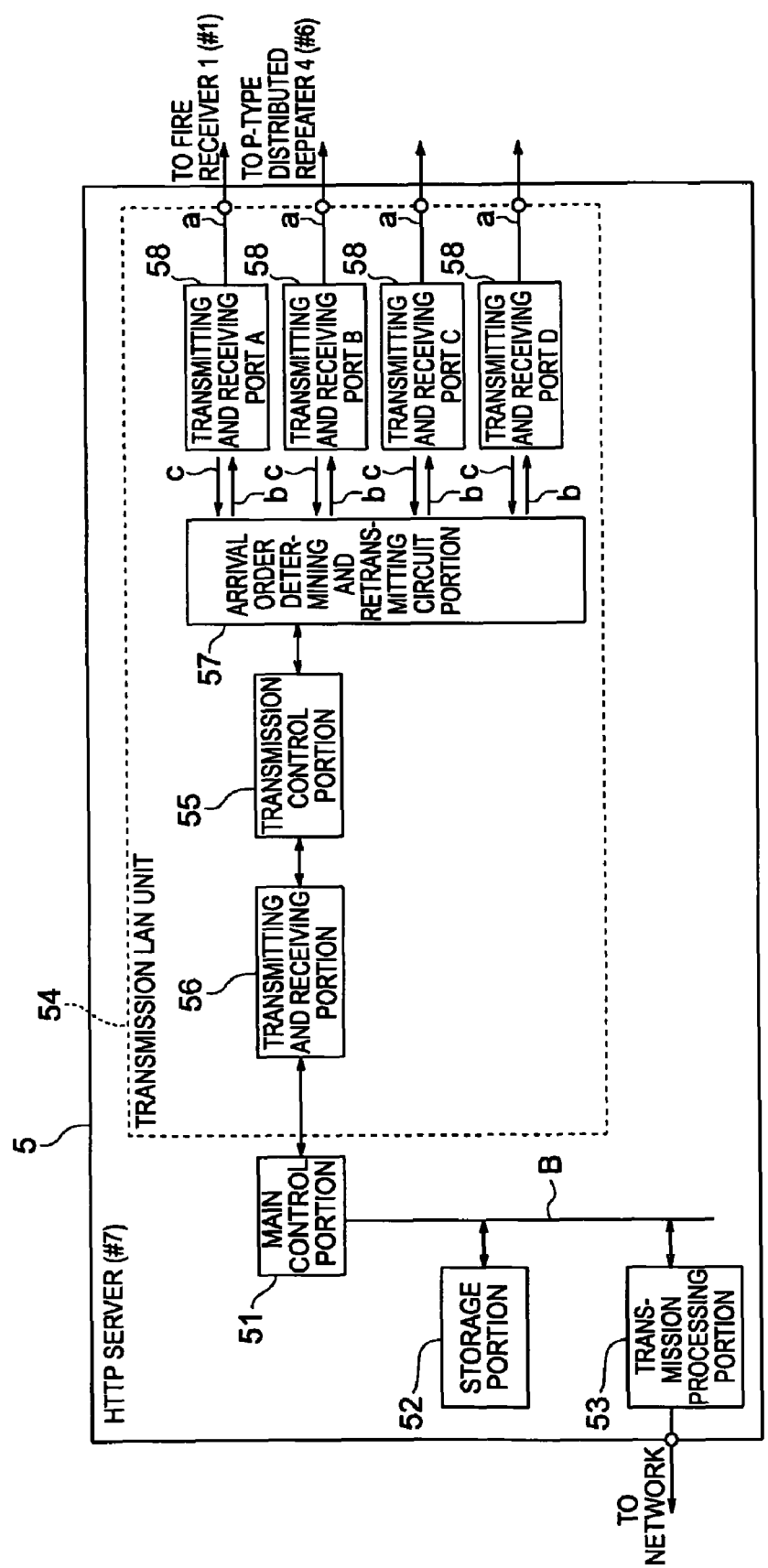

DISASTER PREVENTION SYSTEM

BACKGROUND OF THE INVENTION

1. Field of the Invention

The present invention relates to a disaster prevention system, in particular, a disaster prevention system using a LAN for connecting a plurality of fire receivers to one another or connecting a main fire receiver to a plurality of repeaters for distributed processing which can be independently monitor-controlled, so as to allow the LAN to be expanded in a free form.

2. Description of the Related Art

An example of a conventional disaster prevention system includes a distributed LAN system in which a main fire receiver and a plurality of repeaters for distributed processing which can be independently monitor-controlled are connected to one another via a LAN (for example, refer to JP 05-217088 A (page 1, FIG. 1)).

Another example of a conventional disaster prevention system includes a receiver LAN system in which a plurality of fire receivers are connected to one another via a LAN (for example, refer to JP 2002-170177 A (page 1, FIG. 1)).

In the above-mentioned conventional system such as the distributed LAN system or the receiver LAN system, the LAN as a transmission path is formed into a loop and further, for example, into a double loop in consideration of backup.

However, the conventional distributed LAN system or receiver LAN system, which includes the LAN originally formed into a loop, has a problem in that it is extremely troublesome to additionally installing a terminal device thereto because it requires the path formed into the loop to be reconfigured and rewired.

The present invention has been made to solve the problem, and has an object to provide a disaster prevention system in which the path of the LAN can be formed with flexibility so as to be expanded into a free form.

Also, a fire receiver of so-called R-type is adopted as the fire receiver used in the above-mentioned conventional distributed LAN system or receiver LAN system, which monitors and controls connected devices such as fire detectors based on transmission signals. In order to correspond to the fire receiver of R-type, the repeater for distributed processing performs monitor-control over the connected devices based on an R-type system.

In adopting the above-mentioned LAN system in the field, it is only necessary, in the case of new construction, to install from the beginning of the construction the fire receivers and the repeaters for distributed processing all of which correspond to the R-system.

However, in the case of integrating the LAN system which has already been installed in the existing building and a new LAN system into one, if the already-installed LAN system in the existing building has adopted a line-monitoring system, or a so-called P-type facilities, there has been a problem in that a complete renovation of the building is necessary in order to replace the existing P-type facilities with the R-type facilities.

Also, in order to use a line connected to the P-type fire receiver, two repeaters, that is, a repeater for receiving signals on the line to transmit the signals to an R-type distributed repeater and the R-type distributed repeater for connection to the LAN, are necessary, which leads to a problem of increase in cost and in work of wiring.

Further, it has been conventional to use a dedicated LAN to construct a disaster prevention system. The reason is that if general terminal devices are connected to the LAN, an amount of information of information signals on the LAN is increased, resulting in an delay of information relating to disaster prevention, or the disaster prevention system may be affected by an interruption of the LAN which is caused by a failure occurring in any of the other general terminal devices. When a dedicated LAN is used, however, there has been another problem in that it is not easy to share the information on the LAN via a network such as an intranet or the Internet.

SUMMARY OF THE INVENTION

In view of the above, the present invention has been made to solve the problem, and has an object to make it possible to integrate a building to which a P-type system has been installed into a new LAN system while using the existing P-type facilities. Specifically, the present invention has an object to provide a disaster prevention system capable of connecting the existing P-type system to the LAN merely by connecting a line connected to the existing P-type fire receiver to P-type distributed repeaters, and also capable of sharing information on the LAN among different networks such as an intranet or the Internet with ease.

According to an aspect of the present invention, there is provided a disaster prevention system which includes a LAN and a plurality of terminal devices including a fire receiver or the like, the terminal devices being connected to one another via the LAN, in which the plurality of terminal devices each include: a main control portion for performing operational control; and a transmission LAN unit for performing transmission control regarding transmission and reception of disaster prevention information; the transmission LAN unit includes: a transmitting and receiving circuit directly connected to the main control portion; a transmission control portion for performing communication control; and an arrival order determining and retransmitting circuit portion connected to the transmission control portion and to at least three of transmitting and receiving ports which are capable of connecting to the LAN; and the arrival order determining and retransmitting circuit portion, upon receiving an incoming signal relating to disaster prevention information from any one of the transmission control portion and the transmitting and receiving ports, outputs the received signal to the rest of the transmission control portion and the transmitting and receiving ports while shutting out for a predetermined period of time an incoming signal from the rest of the transmitting and receiving ports that has sent the signal.

Further, in the disaster prevention system according to the present invention, at least one of the plurality of terminal devices has the main control portion connected to a line monitoring and control portion for monitoring and controlling for each line a connected device including a plurality of fire detectors or the like connected to a plurality of lines.

Further, in the disaster prevention system according to the present invention, at least one of the plurality of terminal devices has the main control portion connected to a transmission processing portion for performing a process of distributing disaster prevention information onto a different network, the disaster prevention information being based on a signal on the LAN.

As described above, according to the disaster prevention system of the present invention, the plurality of terminal devices including the fire receiver connected via the LAN each include therein: the main control portion for performing operational control; and the transmission LAN unit for performing transmission control regarding the transmission and reception of the disaster prevention information. The transmission LAN unit includes: the transmitting and receiving circuit directly connected to the main control portion; the transmission control portion for performing communication control; and the arrival order determining and retransmitting circuit portion connected to the transmission control portion and to at least three of transmitting and receiving ports which are capable of connecting to the LAN. The arrival order determining and retransmitting circuit portion, upon receiving an incoming signal relating to disaster prevention information from any one of the transmission control portion and the transmitting and receiving ports, outputs the received signal to the rest of the transmission control portion and the transmitting and receiving ports while shutting out for a predetermined period of time an incoming signal from the rest of the transmitting and receiving ports that has sent the signal, thereby making it possible to connect the terminal device to at least three terminal devices via the LAN through at least three transmitting and receiving ports. Therefore, another terminal device can be additionally provided even when a plurality of terminal devices are already connected in a loop by using two transmitting and receiving ports provided to each one of the terminal devices, by using the remaining one or more of the transmitting and receiving ports to be connected onto the LAN, to thereby allow the path of the LAN to be formed with flexibility, so as to be expanded in a free form.

While allowing the free expansion of the LAN as described above, due to the control performed by the arrival order determining and retransmitting circuit, in the case where the one of the terminal devices has outputted onto the LAN a signal relating to disaster prevention information, the terminals other than the terminal outputted the signal can receive the signal relating to the terminal, thereby producing an effect of allowing the signal relating to the terminal device to be shared by all the other terminal devices via the LAN.

Also, according to the disaster prevention system of the present invention, at least one of the plurality of terminal devices has the main control portion connected to the line monitoring and control portion for monitoring and controlling for each line the connected device including the plurality of fire detectors connected to the line. Therefore, in the case of renovating a building to which a P-type facilities have already been installed by integrating the existing facilities into a new LAN system, it is only necessary to reroute lines of the connected terminal group connected to the P-type fire receiver which has already been installed in the building to the line monitoring and control portion of the terminal device. Accordingly, unlike in the conventional case, there is no need to perform complete renovation of the building so as to convert the existing facilities into an R-type facilities, and there is no need to provide two components, that is, a repeater for receiving a signal on the line to transmit the signal to an R-type distributed repeater and the R-type distributed repeater for connection to the LAN, thereby producing an effect of reducing cost and work of wiring.

Further, according to the disaster prevention system of the present invention, at least one of the plurality of terminal devices has the main control portion connected to a transmission processing portion for performing a process of distributing disaster prevention information onto a different network, the disaster prevention information being based on a signal on the LAN, thereby producing an effect that the main control unit of the terminal device can distribute disaster prevention information based on the signal on the LAN to a different network through the transmission processing portion.

BRIEF DESCRIPTION OF THE DRAWINGS

In the accompanying drawings:
FIG. 4 is a block diagram showing a configuration of an HTTP server of the disaster prevention system according to Embodiment 1 of the present invention.

DETAILED DESCRIPTION OF THE PREFERRED EMBODIMENTS

Figure 1:
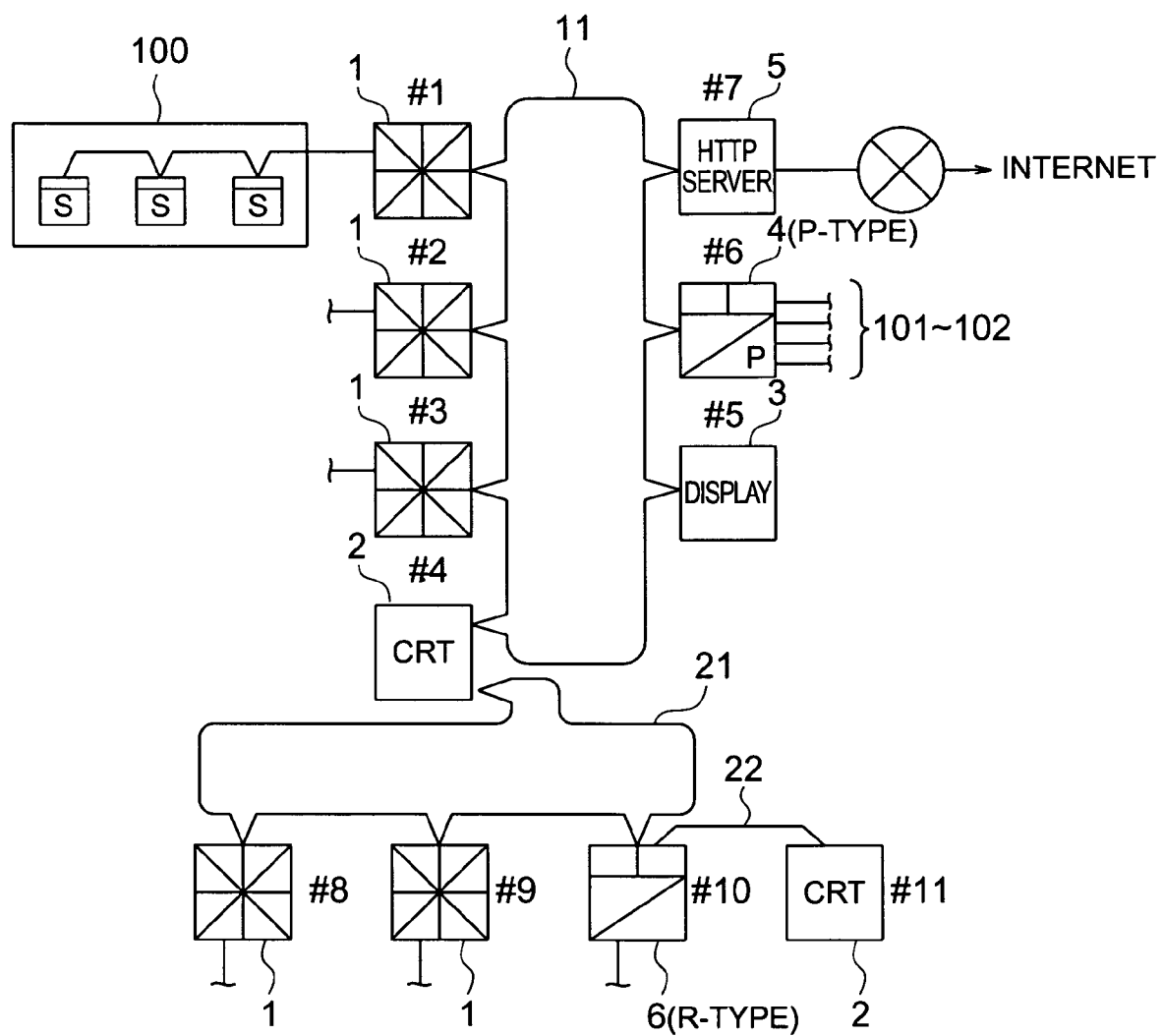
FIG. 1 is a block diagram showing a configuration of a disaster prevention system according to Embodiment 1 of the present invention.
Figure 2:
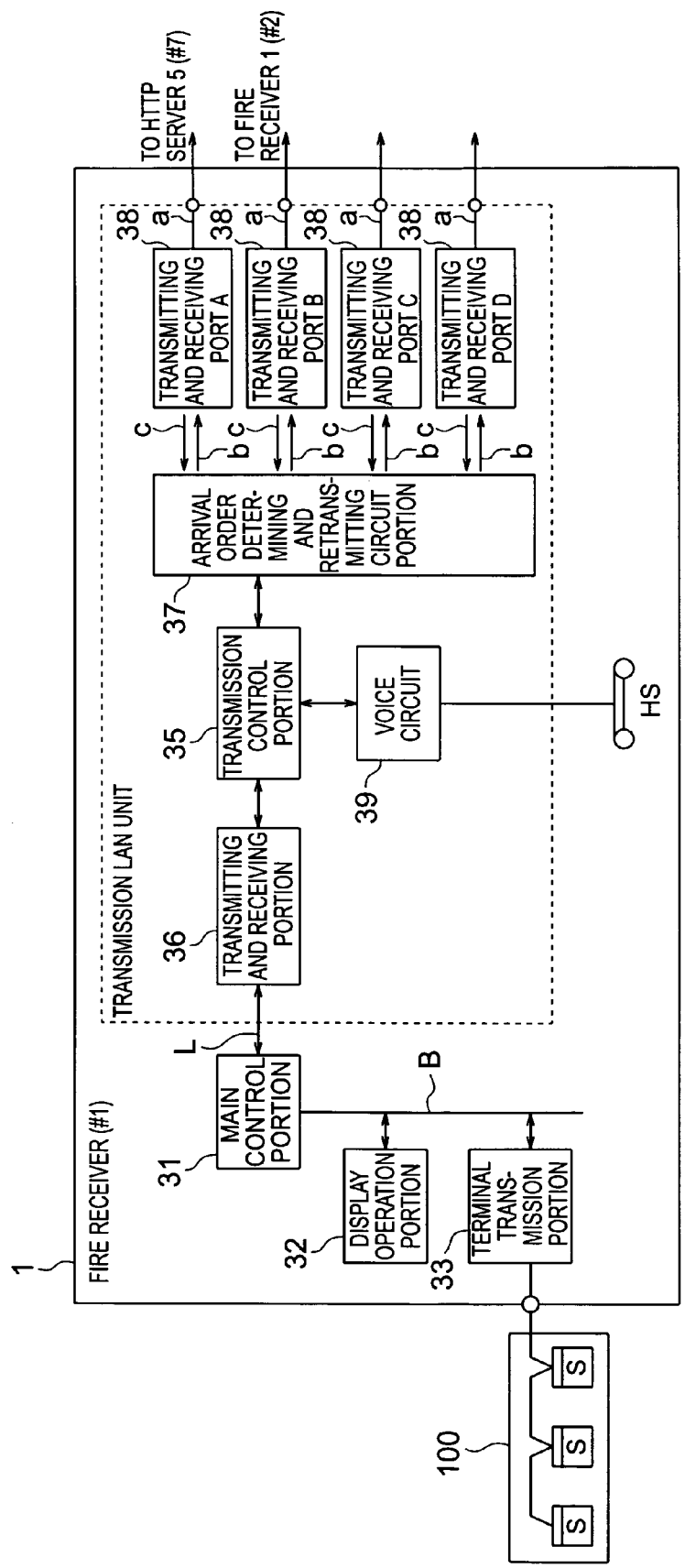
FIG. 2 is a block diagram showing a configuration of a fire receiver of the disaster prevention system according to Embodiment 1 of the present invention.
Figure 3:
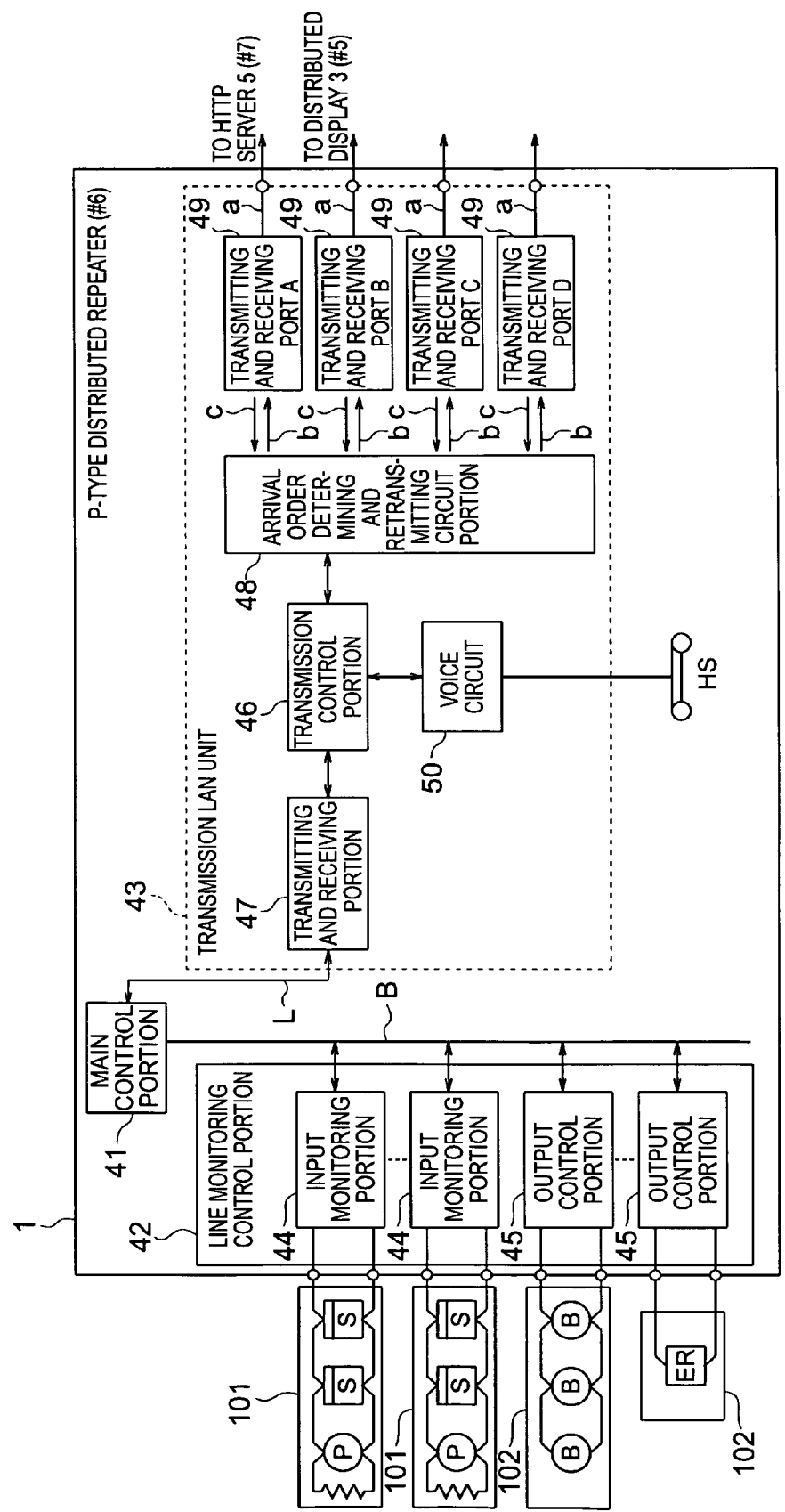
FIG. 3 is a block diagram showing a configuration of a P-type distributed repeater of the disaster prevention system according to Embodiment 1 of the present invention.

FIG. 1 is a block diagram showing a configuration of a disaster prevention system according to Embodiment 1 of the present invention, FIG. 2 is a block diagram showing a configuration of a fire receiver of the disaster prevention system according to Embodiment 1 of the present invention, FIG. 3 is a block diagram showing a configuration of a P-type distributed repeater of the disaster prevention system according to Embodiment 1 of the present invention, and FIG. 4 is a block diagram showing a configuration of an HTTP server of the disaster prevention system according to Embodiment 1 of the present invention.

In the drawings, management numbers #1 to #3 each denote an R-type fire receiver 1 for performing fire monitoring/controlling processing. The fire receivers 1 are each connected to a LAN 11 which is a transmission path formed into a loop, and exchange signals of disaster prevention information with one another via the LAN 11. The fire receivers 1 connected to the LAN 11 are denoted by different management numbers, but all the fire receivers 1 have the same configuration. The LAN 11 is based on, for example, an RS485 standard.

Reference numeral 100 denotes a connected devices group which is connected to each of the fire receivers 1 via a transmission line. The connected devices group 100 is constituted of a district sound device B, a device under control ER, and the like, as well as a fire detector S shown in the drawings, According to this embodiment, those devices do not need to be discriminated between one another. Here, the R-type refers to a system for monitoring and controlling the connected devices such as the fire detectors S based on a transmission signal.

Management number #4 denotes a CRT display panel 2 for displaying information obtained from fire monitoring and the like on a map; #5, a distributed display 3 for displaying information obtained from fire monitoring and the like in characters; #6, a P-type (line-monitoring type) distributed repeater 4 for performing fire monitoring/control processing in the similar manner as the fire receiver 1; #7, an HTTP server 5 serving as an interface for distributing information in the system to other networks. Those devices are all connected to the LAN 11.

The P-type distributed repeater 4 has an input-type connected devices group 101 and an output-type connected devices group 102 connected to each line. The input-type connected devices group 101 is constituted of the fire detector S, a fire transmitter P, and the like, and the output-type connected devices group 102 is constituted of the district sound device B, devices under control ER such as smoke exhaust prevention devices and fire extinguishing devices, and the like. Here, the P-type refers to a system for monitoring and controlling the connected devices such as the fire detector S for each line.

The HTTP server 5 is connected to the LAN 11, and may also be connected to a network different from the LAN, such as the Internet, for example.

Management numbers #8 and #9 each denote an R-type fire receivers 1 similar to the above. Those fire receivers 1 are connected to a LAN 21, which is different from the LAN 11, formed into a loop to be additionally provided to the CRT display panel 2 denoted by management number #4.

Management number #10 denotes an R-type distributed repeater 6 for performing fire monitoring/control processing in the similar manner as the fire receiver 1, to which a connected devices group (not shown) similar to the above-mentioned connected devices group 100 is connected via the transmission line, and is connected to the additional LAN 21 in the similar manner as the fire receivers 1 denoted by management numbers #8 and #9.

Also, the R-type distributed repeater 6 has a CRT display panel 2 denoted by management number #11 connected thereto via a branched LAN 22 which has been provided in addition to the additional LAN 21 as a branched transmission path.

Next, an explanation is given of a configuration of the fire receiver 1 shown in FIG. 2.

As an example, the fire receiver 1 denoted by management number #1 is constituted of a main control portion 31 for performing operational control as the fire receiver 1, a display operation portion 32 for performing operational input relating to fire monitoring/control and displaying disaster prevention information such as a fire monitoring state, a terminal transmission portion 33 connected to the connected devices group 100 for transmitting and receiving terminal information such as fire signals from the connected devices group 100 through transmission, and a transmission LAN unit 34 for exchanging signals relating to disaster prevention information between the main control portion 31 and the LAN 11. As an example of the control unit, the display operation portion 32 and the terminal transmission portion 33 described above are connected to the main control portion 31 via a bus B.

The transmission LAN unit 34 is constituted of a transmission control portion 35, a transmitting and receiving portion 36, an arrival order determining and retransmitting circuit portion 37, and four of transmitting and receiving ports A to D 38. The transmission control portion 35 performs transmission control for transmitting and receiving signals relating to disaster prevention information, such as fire signals. The transmitting and receiving portion 36 serves as an interface for connecting the main control portion 31 and the transmission control portion 35. The arrival order determining and retransmitting circuit portion 37 serves as an active HUB which performs an output to other ports based on an input to one of the ports and shuts out input for a predetermined period of time after the output. The four transmitting and receiving ports A to D 38 exchange signals between the arrival order determining and retransmitting circuit portion 37 and the LAN 11. The transmission LAN unit 34 is connected to the main control portion 31 via a signal line L.

Upon receiving an incoming signal relating to disaster prevention information from any one of the transmission control portion 35 and the transmitting and receiving ports A to D 38, the arrival order determining and retransmitting circuit portion 37 outputs the received signal to the rest of the transmission control portion 35 and the transmitting and receiving ports A to D 38 while shutting out for a predetermined period of time an incoming signal from the rest of the transmitting and receiving ports A to D 38 that has sent the signal.

The transmission control portion 35 is connected to a voice circuit 39 which performs AD/DA processes on voice data from a hand set HS or from the transmission control portion 35 and outputs the data thus processed.

The transmitting and receiving ports A to D 38 each have an output/input port a connected to the LAN 11, and an input port b and an output port c both connected to the arrival order determining and retransmitting circuit portion 37.

The output/input ports a, the input ports b, and an output ports c of those four transmitting and receiving ports A to D 38 are usually available so as to allow signals relating to disaster prevention information to be inputted and outputted.

The CRT display panel 2 includes a main control portion and a transmission LAN unit similar to those of the fire receiver 1, and further includes a CRT display portion as a control unit. The CRT display panel 2 may also include an operation portion as necessary.

The distributed display 3 includes a main control portion and a transmission LAN unit similar to those of the fire receiver 1, and further includes a display portion such as a district window as a control unit. The distributed display 3 may also include an operation portion as necessary.

Further, the R-type distributed repeater 6 is substantially the same with the fire receiver 1 in construction, except that the R-type distributed repeater 6 does not have the display operation portion 32 included in the fire receiver 1.

Next, an explanation is given of a configuration of the P-type distributed repeater 4 shown in FIG. 3.

As an example, the P-type distributed repeater 4 denoted by management number #6 is constituted of a main control portion 41 for performing operational control as the P-type distributed repeater 4, a line monitoring and control portion 42 for monitoring and controlling for each line a connected devices group which is connected to each line, and a transmission LAN unit 43 for exchanging signals relating to disaster prevention information between the main control portion 41 and the LAN 11. As an example of the control unit, the line monitoring and control portion 42 is connected to the main control portion 41 via a bus B.

The line monitoring and controlling portion 42 is constituted of input monitoring portions 44 and output control portions 45. The input monitoring portions 44 each receive for each line fire signals from an input-type connected devices group 101 which is constituted of the fire detector S and a fire transmitter P connected to lines. The output control portions 45 output for each line a control output to an output-type connected devices group 102 which is constituted of the district sound device B and the devices under control ER such as the smoke exhaust prevention devices and the fire extinguishing devices connected to the line.

The transmission LAN unit 43 is similar to the transmission LAN unit 34 of FIG. 1 in configuration, and is constituted of a transmission control portion 46, a transmitting and receiving portion 47, an arrival order determining and retransmitting circuit portion 48, and four of transmitting and receiving ports A to D 49. The transmission control portion 46 performs transmission control for transmitting and receiving signals relating to disaster prevention information, such as fire signals. The transmitting and receiving portion 47 serves as an interface for connecting the main control portion 41 and the transmission control portion 46. The arrival order determining and retransmitting circuit portion 48 performs an output to other ports based on an input to one of the ports and shuts out input for a predetermined period of time after the output. The four transmitting and receiving ports A to D 49 exchange signals between the arrival order determining and retransmitting circuit portion 48 and the LAN 11. The transmission LAN unit 43 is connected to the main control portion 41 via the signal line L.

Upon receiving an incoming signal relating to disaster prevention information from any one of the transmission control portion 46 and the transmitting and receiving ports A to D 49, the arrival order determining and retransmitting circuit portion 48 outputs the received signal to the rest of the transmission control portion 46 and the transmitting and receiving ports A to D 49 while shutting out for a predetermined period of time an incoming signal from the rest of the transmitting and receiving ports A to D 49 that has sent the signal.

The transmission control portion 46 is connected to a voice circuit 50 which performs AD/DA processes on voice data from a hand set HS or from the transmission control portion 46 and outputs the data thus processed.

Next, an explanation is given on the HTTP server 5 shown in FIG. 4.

As an example, the HTTP server 5 denoted by management number #7 is constituted of a main control portion 51 for performing operational control as the HTTP server 5, a storage portion 52 for storing disaster prevention information including, for example, a fire monitoring state, a transmission processing portion 53 for distributing disaster prevention information onto different networks such as the Internet and an intranet, and a transmission LAN unit 54 for exchanging signals relating to disaster prevention information between the main control portion 51 and the LAN 11. As an example of the control unit, the storage portion 52 and the transmission processing portion 53 described above are connected to the main control portion 51 via a bus B.

The transmission LAN unit 54 is similar to the transmission LAN unit 34 of FIG. 1 in configuration, and is constituted of a transmission control portion 55, a transmitting and receiving portion 56, an arrival order determining and retransmitting circuit portion 57, and four of transmitting and receiving ports A to D 58. The transmission control portion 55 performs transmission control for transmitting and receiving signals relating to disaster prevention information, such as fire signals. The transmitting and receiving portion 56 serves as an interface for connecting the main control portion 51 and the transmission control portion 55. The arrival order determining and retransmitting circuit portion 57 performs an output to other ports based on an input to one of the ports and shuts out input for a predetermined period of time after the output. The four transmitting and receiving ports A to D 58 exchange signals between the arrival order determining and retransmitting circuit portion 57 and the LAN 11. The transmission LAN unit 54 is connected to the main control portion 51 via the signal line L.

Upon receiving an incoming signal relating to disaster prevention information from any one of the transmission control portion 55 and the transmitting and receiving ports A to D 58, the arrival order determining and retransmitting circuit portion 57 outputs the received signal to the rest of the transmission control portion 55 and the transmitting and receiving ports A to D 58 while shutting out for a predetermined period of time an incoming signal from the rest of the transmitting and receiving ports A to D 58 that has sent the signal.

Next, an explanation is given of an operation of a disaster prevention system according to Embodiment 1 of the present invention.

For example, the connected devices group 100 connected to the fire receiver 1 of management number #1 detects fire and the like and sends out a fire signal to the fire receiver 1 of #1. In the fire receiver 1, the main control portion 31 judges that fire is occurring based on the fire signal, and sends out disaster prevention information associated with the fire signal to the transmission LAN unit 34.

In the transmission LAN unit 34, the transmission control portion 35 sends the disaster prevention information which has been received through the transmitting and receiving portion 36 to the arrival order determining and retransmitting circuit portion 37. The arrival order determining and retransmitting circuit portion 37 sends out the disaster prevention information to each of the four transmitting and receiving ports A to D 38 through the input ports b provided thereto, and closes the output ports c for a predetermined period of time, to thereby prohibit for a predetermined period of time an incoming signal from the transmitting and receiving ports A to D 38 to which the information has been sent.

The transmitting and receiving ports A to D 38 each output the disaster prevention information to the LAN 11 through the input/output port a. Due to the control over the ports or the like and the prohibition of incoming signal for a predetermined period of time which are made by the arrival order determining and retransmitting circuit portion 37 as described above, the flow of the signals relating to the disaster prevention information is uniformly defined in only one direction in the system as a whole so that the signals are inputted to the terminal devices in the direction.

Accordingly, all the terminal devices connected to the LANs 11, 21, and 22 except the fire receiver 1 of #1, that is, the fire receivers 1, the CRT display panels 2, the distributed display 3, the P-type distributed repeater 4, the HTTP server 5, and the like, are allowed to receive the disaster prevention information on the fire receiver 1 of #1, which makes it possible to share the disaster prevention information on the fire receiver 1 of #1 among all the other terminal devices via the LANs 11, 21, and 22.

Also, for example, in the HTTP server 5 of #7, when a signal of disaster prevention information is inputted to the input/output port a of the transmitting and receiving port A 58, the transmitting and receiving port A 58 outputs the signal to the arrival order determining and retransmitting circuit portion 57 through the output port c thereof. Then, the arrival order determining and retransmitting circuit portion 57 closes the input port b of the transmitting and receiving port A 58 while closing for a predetermined period of time the output ports c of the rest of the transmitting and receiving ports, that is, the transmitting and receiving ports B to D 58, and sends the signal to the transmitting and receiving ports B to D 58 through the input ports b which are available.

The signal is notified through the transmission control portion 55 and the transmitting and receiving portion 56 to the main control portion 51 to be stored therein, where the signal is controlled to be sent out to the other networks through the transmission processing portion 53. In other words, the main control portion 51 performs necessary control over the control unit. The rest of the transmitting and receiving ports, that is, the transmitting and receiving ports B to D 58 each output the input signal onto the LAN 11 through the input/output port a.

Due to the control over the ports or the like made by the arrival order determining and retransmitting circuit portion 57 as described above, the flow of the signals relating to the disaster prevention information is uniformly defined in only one direction in the system as a whole so that the signals are inputted to the terminal devices in the direction.

Accordingly, all the other (subsequent) terminal devices connected to the LANs 11, 21, and 22 except the HTTP server 5, that is, the fire receivers 1, the CRT display panels 2, the distributed display 3, and the P-type distributed repeater 4 are allowed to receive signals of disaster prevention information via the HTTP server 5, which makes it possible to share the signals of the disaster prevention information sent from the HTTP server 5 among all the other terminal devices via the LANs 11, 21, and 22.

Further, according to the disaster prevention system of Embodiment 1, in a case of renovating a building which has been independently operated under a system using the existing P-type fire receiver by incorporating the existing system of the building into the new LAN system, it is possible to connect the P-type distributed repeater 4, in place of the existing P-type fire receiver, to the LAN 11.

The P-type distributed repeater 4 includes a main control portion 41 for performing operational control as the distributed repeater 4, the line monitoring and control portion 42 for monitoring and controlling for each line the connected devices group which is connected to each line, and the transmission LAN unit 43 for exchanging signals relating to disaster prevention information between the main control portion 41 and the LAN 11. Since the transmission LAN unit 43 is capable of exchanging signals of disaster prevention information with other terminal device via the LAN 11, in the same manner as the transmission LAN unit 34 of the fire receiver 1, it is only necessary to reroute the lines connected to the input-type connected devices group 101 and the output-type connected devices group 102 which are connected to the P-type fire receiver that has already been installed in the building, so as to connect the lines to the line monitoring and control portion 42. Therefore, unlike in the conventional case, it is unnecessary to reconstruct the entire system by replacing all the P-type facilities such as the connected devices group, the lines, and the fire receivers, with those of R-type facilities. It is also unnecessary to provide two repeaters, that is, a repeater for receiving signals on the line to transmit the signals to the R-type distributed repeater and the R-type distributed repeater for connection to the LAN, which leads to a reduction in cost and in work of wiring.

Also, since the line monitoring and control portion 42 includes the input monitoring portion 44 for receiving a fire signal from the input-type connected devices group 101 for each line and the output control portion 45 for outputting a control output to the output-type connected devices group 102 for each line, it is possible to use, without any modification, the input-type connected devices group 101, the output-type connected devices group 102, and the lines thereof which are connected to the P-type fire receiver already installed in the building.

Further, in the P-type distributed repeater 4, the transmission LAN unit 43 includes the arrival order determining and retransmitting circuit portion 48 and four transmitting and receiving ports A to D 49 similar to those of the transmission LAN unit 34 of the fire receiver 1. Therefore, all the terminal devices connected to the LANs 11, 21, and 22, except the P-type distributed repeater 4, are allowed to receive disaster prevention information on the P-type distributed repeater 4, which makes it possible to share the disaster prevention information on the P-type distributed repeater 4 among all the other terminal devices via the LANs 11, 21, and 22.

Also, the HTTP server 5 is connected to the LAN 11 of the disaster prevention system of this embodiment, for distributing information in the system to other networks. The HTTP server 5 is capable of receiving signals of disaster prevention information from all the other terminal devices connected to the LANs 11, 21, and 22, which makes it possible to distribute signals of disaster prevention information from all the other terminal devices onto networks such as the Internet or an intranet which are different from the LAN 11, through the transmission processing portion 53. The HTTP server 5 is also capable of receiving information from other networks through the transmission processing portion 53.

It should be noted that when different networks are provided in the same building in which the disaster prevention system of this embodiment is installed, it is possible to perform centralized disaster prevention monitoring by merely providing a general computer to each of the different networks. The CRT display panel 2, the distributed display 3, or the like may be replaced by the general computer.

The main control portion 51 is capable of controlling the transmission processing portion 53 of the HTTP server 5 so as to allow the disaster prevention information to be distributed onto different networks while blocking information from the different networks. This control is made in view of security against virus infection by information from the outside or tampering of data.

Also, all the terminal devices connected to the LAN 11 in the disaster prevention system of Embodiment 1, that is, the fire receivers 1, the CRT display panel 2, the distributed display 3, the P-type distributed repeater 4, and the HTTP server 5 each are provided with one of the transmission LAN units 34, 43, and 54, which are similar to one another. The transmission LAN units 34, 43, and 54 each include four transmitting and receiving ports A to D.

According to Embodiment 1, two transmitting and receiving ports, that is, the transmitting and receiving ports A and B are connected to the LAN 11, while the rest of the transmitting and receiving ports, that is, the transmitting and receiving ports C and D are available.

Therefore, as shown in FIG. 1 which shows Embodiment 1, it is possible to connect the additional LAN 21 to the two transmitting and receiving ports C and D which are available in the transmission LAN unit of the CRT display panel 2 of #4. The LAN can be formed into a double loop by connecting the additional LAN 21 to the two transmitting and receiving ports C and D, thereby making it possible to install an additional loop.

In this case, it is easy to carry out wiring because it is only necessary to connect the additional LAN 21 to the two transmitting and receiving ports C and D without rewiring the LAN 11, which allows the LAN to be expanded into a free form.

When installing the additional LAN 21, there is no need to use both of the available transmitting and receiving ports C and D of the CRT display panel 2 of #4. It is also possible to construct a loop by using the transmitting and receiving port C (if available) of the distributed display 3 of #5 instead of the transmitting and the receiving port D of the CRT display panel 2. In other words, an additional LAN can be connected into a loop when at least three transmitting and receiving ports are provided.

The case of connecting two fire receivers 1 of #8 and #9, the R-type distributed repeater 6 of #10 to the additional LAN 21 connected as described above, and further connecting the CRT display panel 2 of #11 to one of the two available transmitting and receiving ports of the transmission LAN unit in the R-type distributed repeater 6 of #10 turns out to be equivalent to a case of connecting those terminal devices to a single large LAN, and therefore all the terminal devices can share the disaster prevention information of other terminal devices with one another.

In the manner as described above, the terminal devices can be connected in various forms, such as, connected into a loop, a star, or connected via a bus.

In Embodiment 1 described above, the additional LAN 21 is connected to the two available transmitting and receiving ports C and D in the transmission LAN unit of the CRT display panel 2, whereas it is also possible to connect the additional LAN to the two available transmitting and receiving ports C and D in any of the fire receiver 1, the distributed display 3, the P-type distributed repeater 4, the HTTP server 5, and the R-type distributed repeater 6, other than the CRT display panel 2.

Note that each terminal device has four transmitting and receiving ports, and therefore it is also possible to form a double loop by connecting a further additional LAN into a loop to each terminal device that is connected to the LAN 11 in a loop.

Also, in Embodiment 1 where the fire receiver 1 is set as the terminal device, the bus B is provided in the device on which necessary control units such as the display operation portion 32 and the terminal transmission portion 33 are provided, and the main control portion 31 exchanges signals with the control units via the bus B, while the transmission LAN unit 34 is connected to the main control portion 31 via the signal line L through which signals are directly transmitted and received. With this configuration, the main control portion 31 can differentiate between the necessary control unit and the transmission LAN unit 34, to thereby allow the transmission LAN unit 34 to output bus failure information onto the LAN in the event of a failure occurring in the bus B because the failure does not affect the transmission LAN unit 34. Further, according to Embodiment 1, the display operation portion 32 and the terminal transmission portion 33 are provided to the bus B as the necessary control unit when the fire receiver 1 is provided as the terminal device. Alternatively, however, the line monitoring and control portion 42 may be provided to the bus B as the necessary control unit when the P-type distributed repeater is provided as the terminal device, or the storage portion 52 or the transmission processing portion 53 may be provided to the bus B as the necessary control unit when the HTTP server 5 is provided as the terminal device. In this manner, it is possible to provide the necessary control unit according to the application purpose without changing the basic configuration of the terminal device, to thereby foster versatility in production of the terminal device depending on the use thereof.

The terminal devices can be adapted to the LAN system or can be used as a stand-alone facility depending on the presence or absence of the transmission LAN unit provided thereto, which contributes to achieve versatility.

What is claimed is:

1. A disaster prevention system, comprising:
a LAN; and
a plurality of terminal devices connected to one another via said LAN and including at least one fire receiver,
each of said plurality of terminal devices comprising:
a main control portion for performing operational control; and
a transmission LAN unit for performing transmission control regarding transmission and reception of disaster prevention information;
said transmission LAN unit comprises:
a transmitting and receiving circuit directly connected to said main control portion;
a transmission control portion for performing communication control; and
an arrival order determining and retransmitting circuit portion connected to said transmission control portion and to at least three of transmitting and receiving ports which are capable of connecting to said LAN,
wherein
each of said transmitting and receiving ports includes at least one input port and at least one output port;
when a signal relating to the disaster prevention information is inputted to one of said transmitting and receiving ports, said one of said transmitting and receiving ports outputs the signal to the arrival order determining and retransmitting circuit portion via the output port of said one of said transmitting and receiving ports, and
the arrival order determining and retransmitting circuit portion substantially simultaneously (i) closes the input port of said one of said transmitting and receiving ports, (ii) closes the output ports of said transmitting and receiving ports other than said one of said transmitting and receiving ports, and (iii) sends the signal to said transmitting and receiving ports other than said one of said transmitting and receiving ports, via the input ports of said transmitting and receiving ports other than said one of said transmitting and receiving ports.

2. The disaster prevention system according to claim 1, wherein
said main control portion, of said terminal device, is provided with a control unit through a bus, and said main control portion exchanges signals with the control unit via the bus; and
said transmission LAN unit is connected to said main control portion via a signal line for directly exchanging signals.

3. The disaster prevention system according to claim 1, wherein said terminal device includes four transmitting and receiving ports.

4. The disaster prevention system according to claim 1, wherein at least one of said plurality of terminal devices has said main control portion connected to a line monitoring and control portion for monitoring and controlling, for each line, a connected device including a plurality of fire detectors connected to a plurality of lines.

5. The disaster prevention system according to claim 1, wherein at least one of said plurality of terminal devices has said main control portion connected to a transmission processing portion for performing a process of transmitting the disaster prevention information to a different network, the disaster prevention information being based on a signal on the LAN.

6. The disaster prevention system according to claim 1, wherein at least one of said plurality of terminal devices has said transmission control portion connected to a voice circuit for performing AD/DA processes on voice data and outputting the processed voice data.

7. The disaster prevention system according to claim 1, wherein at least one of said plurality of terminal devices has said main control portion connected to a display operation portion, via a bus, for displaying the disaster prevention information and performing operational input relating to fire monitoring/control.

8. The disaster prevention system according to claim 1, wherein at least one of said plurality of terminal devices has said main control portion connected to a terminal transmission portion, via a bus, for transmitting and receiving terminal information from a connected devices group.

9. The disaster prevention system according to claim 1, wherein at least one of said plurality of terminal devices has said main control portion connected to a storage portion, via a bus, for storing the disaster prevention information.

10. The disaster prevention system according to claim 1, wherein said arrival order determining and retransmitting circuit portion substantially simultaneously (i) outputs the signal relating to the disaster prevention information, and (ii) shuts out any other incoming signals from said transmitting and receiving ports other than said one of said transmitting and receiving ports, so that the disaster information flows uniformly in one direction in the disaster prevention system as a whole.

11. The disaster prevention system according to claim 1, wherein each of said plurality of terminal devices is an HTTP server and further comprises:

a storage portion for storing the disaster prevention information; and a transmission processing portion for distributing the disaster prevention information onto other networks.

12. The disaster prevention system according to claim 1, wherein said plurality of terminal devices are interconnected in a loop connection.

13. The disaster prevention system according to claim 1, wherein said plurality of terminal devices are interconnected in a star connection.

14. The disaster prevention system according to claim 1, wherein said plurality of terminal devices are interconnected via a bus.

\* \* \* \* \*